United States Patent
Lin

(10) Patent No.: US 10,050,421 B2
(45) Date of Patent: *Aug. 14, 2018

(54) STRIPPER WHICH CAN SERVE AS A WRENCH

(71) Applicant: Hanlong Industrial Co., Ltd., New Taipei (TW)

(72) Inventor: Pai-Wei Lin, New Taipei (TW)

(73) Assignee: Hanlong Industrial Co., Ltd., New Taipei (TW)

( * ) Notice: Subject to any disclaimer, the term of this patent is extended or adjusted under 35 U.S.C. 154(b) by 132 days.

This patent is subject to a terminal disclaimer.

(21) Appl. No.: 15/133,259

(22) Filed: Apr. 20, 2016

(65) Prior Publication Data

US 2017/0207611 A1 Jul. 20, 2017

(30) Foreign Application Priority Data

Jan. 20, 2016 (TW) .............................. 105200846 U

(51) Int. Cl.
*H02G 1/12* (2006.01)
*B25F 1/02* (2006.01)

(52) U.S. Cl.
CPC ............. *H02G 1/1224* (2013.01); *B25F 1/02* (2013.01)

(58) Field of Classification Search
CPC ................................ H02G 1/1224; B25F 1/02
USPC ................................................. 7/107; 81/9.3
See application file for complete search history.

(56) References Cited

U.S. PATENT DOCUMENTS

| 4,179,956 | A | * | 12/1979 | Gooley | H02G 1/1224 30/90.8 |
| 5,009,130 | A | * | 4/1991 | Bieganski | H02G 1/1224 30/90.1 |
| 5,398,413 | A | * | 3/1995 | Chen | H02G 1/1224 30/90.1 |
| 8,733,212 | B2 | * | 5/2014 | Liu | B25F 1/02 7/107 |
| 9,425,593 | B2 | * | 8/2016 | Lin | H02G 1/1224 |
| 2010/0186175 | A1 | * | 7/2010 | Watson | B25F 1/04 7/158 |

* cited by examiner

*Primary Examiner* — Hadi Shakeri
(74) *Attorney, Agent, or Firm* — Alan D. Kamrath; Kamrath IP Lawfirm, P.A.

(57) ABSTRACT

A stripper, which can serve as a wrench, includes a body, an exchangeable tool holder, a blade, a fixing member and an elastic element. The body includes a hole and a notch used for accommodating a coaxial terminal. The exchangeable tool holder is disposed in the hole, and the exchangeable tool holder has a first side comprising a recess. The blade is connected with the exchangeable tool holder, and at least one portion of the blade protrudes out of the recess. The fixing member is movably connected with the body and includes a concave located in the hole to correspond to the recess and to form an opening along with the recess. The opening is used for accommodating a wire. The elastic element is connected with the fixing member to provide an elastic force to the fixing member.

10 Claims, 6 Drawing Sheets

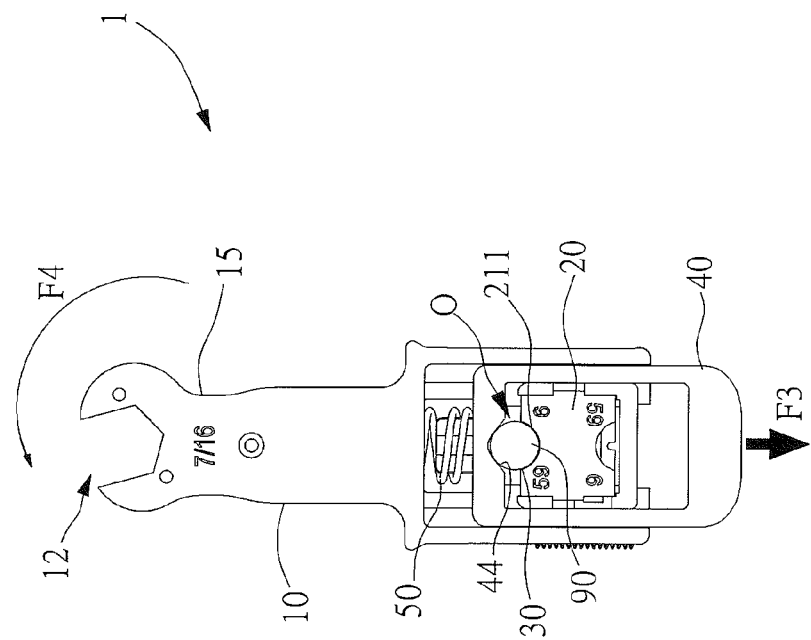
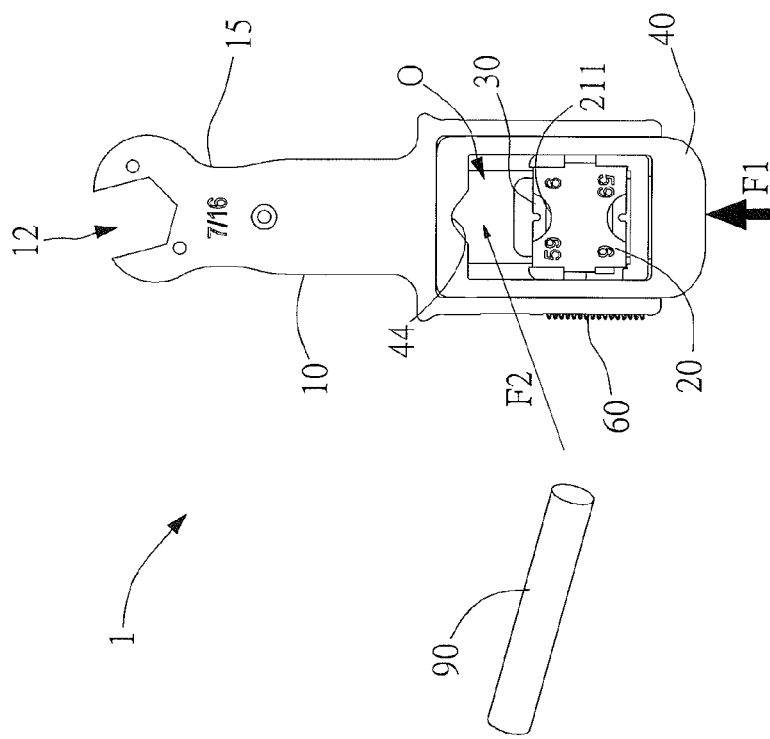
FIG.3A
FIG.3B

STRIPPER WHICH CAN SERVE AS A WRENCH

BACKGROUND OF THE INVENTION

1. Field of the Invention

The present invention relates to a stripper and, more particularly, to a stripper which has a replaceable blade and which is used for locking a coaxial terminal.

2. Description of the Related Art

Coaxial cables are widely used for signal transmissions. In general, a coaxial cable comprises a copper wire in the center and wrapped in two outer layers. When it is necessary to electrically connect the coaxial cable to an electrical appliance/equipment, the outer layers of the coaxial cable have to be stripped by using a stripper to expose the copper wire in the center.

In addition, when an operator would like to lock a coaxial terminal connected to one end of the coaxial cable to a signal terminal of the electrical appliance/equipment, a wrench tool is necessary. Combining a stripper to strip wires of various sizes and a wrench tool would increase the convenience of carrying the two tools for an operator.

SUMMARY OF THE INVENTION

It is an object of the present invention to provide a stripper which has a replaceable blade and which can serve as a wrench.

In order to achieve the above object, the present invention provides a stripper which can serve as a wrench for a user to easily remove at least one outer layer of a cable and lock a coaxial terminal with a signal terminal or dismantle the coaxial terminal from the signal terminal. The stripper which can serve as a wrench of the present invention comprises a body, an exchangeable tool holder, at least one blade, a fixing member and an elastic element. The body includes a hole and a notch. The shape of the notch is the same as the cross-section shape of the coaxial terminal, and the size of the notch and cross-section area of the coaxial terminal are substantially equal. The exchangeable tool holder is disposed in the hole. The exchangeable tool holder has a first side comprising a recess. The at least one blade is connected with the exchangeable tool holder, and at least one portion of the at least one blade protrudes out of the recess. The fixing member is movably combined with the body. The fixing member comprises a concave, and the concave is located in the hole to correspond to the recess and thereby to form an opening with the recess. The elastic element is connected with the fixing member to provide an elastic force to the fixing member. The fixing member is driven by the elastic force to work with the at least one blade to hold the cable when the cable is placed in the opening. The least one blade removes the at least one outer layer by rotation or movement of the body when the cable is fixedly held in the opening.

According to an embodiment of the present invention, the body is a one-piece member made by injection molding.

According to an embodiment of the present invention, the fixing member comprises a pair of cases, and each of the cases has a hollow adjacent and communicating with the hole. The concave is disposed at a side of the hollow.

According to an embodiment of the present invention, the body further comprises two pairs of slots, and each pair of the slots are disposed at two corresponding sides of the body respectively. Each of the cases has a pair of flanges, and the flanges of each of the cases are respectively engaged with the pair of slots at the same side of the body and capable of being moved therein, such that the fixing member is movably connected with the body.

According to an embodiment of the present invention, the body further comprises a containing groove communicating with the hole for accommodating the elastic element.

According to an embodiment of the present invention, the fixing member further comprises a bump disposed in the containing groove for limiting the movement of the elastic element.

According to an embodiment of the present invention, the body comprises a pair of arc-shaped recesses respectively disposed at two corresponding sides of the body close to the notch.

According to an embodiment of the present invention, two concave tracks are respectively disposed in two side walls of the hole. The exchangeable tool holder further comprises a third side and a fourth side corresponding to the third side. Two sliding bumps are respectively disposed on the third side and the fourth side for respectively engaging with each one of the two concave tracks, thereby allowing the exchangeable tool holder to be detachably connected with the body.

According to an embodiment of the present invention, the stripper further comprises a Velcro strip connected with the body.

According to an embodiment of the present invention, the stripper further comprises a retaining element connected with the exchangeable tool holder. The retaining element stops one end of the cable when the one end of the cable passes through the opening and reaches the retaining element, thereby allowing the user to rotate the body to remove a fixed length of the at least one outer layer.

According to an embodiment of the present invention, the exchangeable tool holder is detachably connected with the body.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 3A illustrates a view of placing a cable into an opening;

FIG. 3B illustrates a view of removing an outer layer of the cable by rotating the cable;

DETAILED DESCRIPTION OF THE PREFERRED EMBODIMENTS

Figure 1:
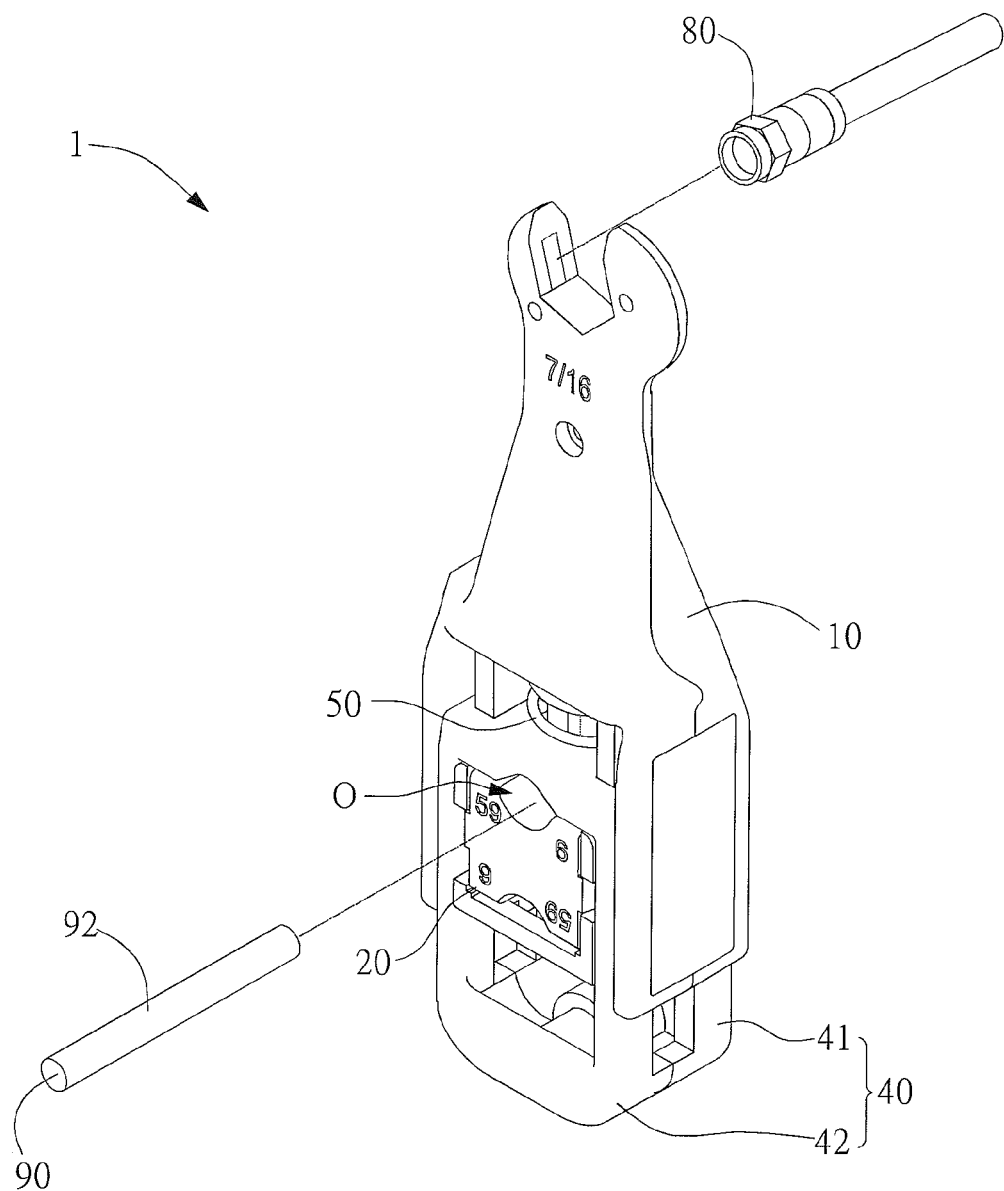
FIG. 1 illustrates a side view of a stripper of the present invention.
Figure 2:
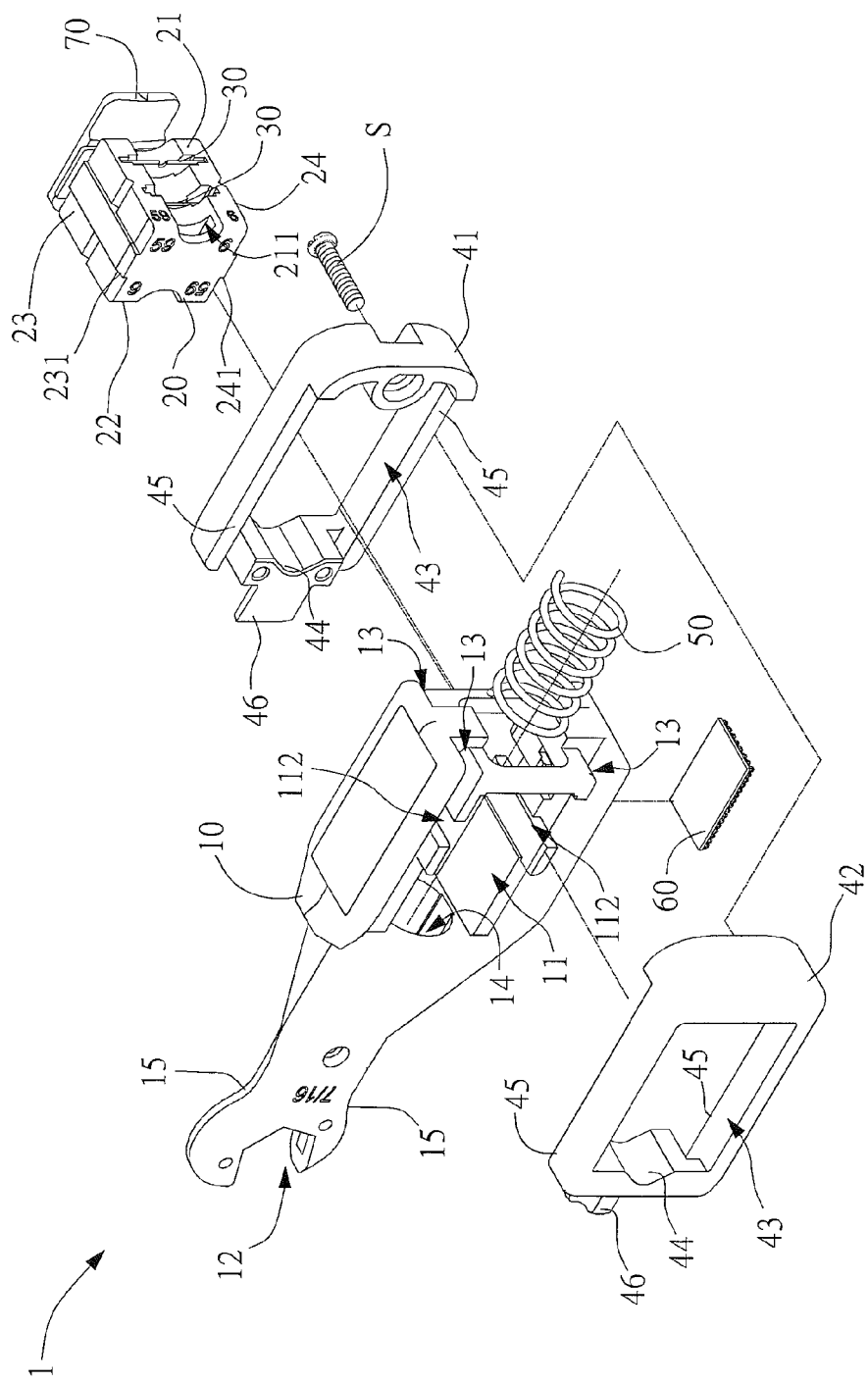
FIG. 2 illustrates an exploded view of the stripper of the present invention.
Figure 4:
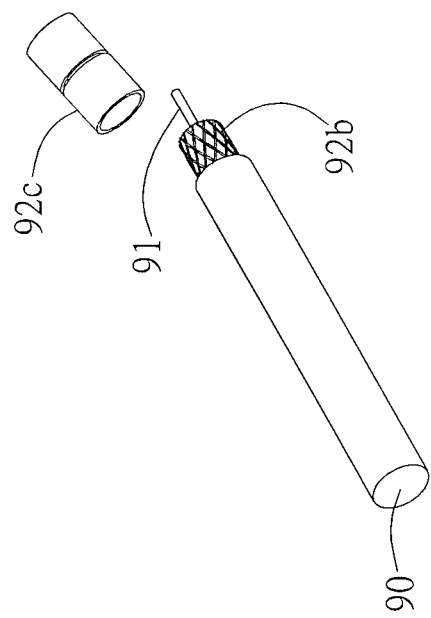
FIG. 4 illustrates a view of the cable after the outer layer is removed by rotating the cable.
Figure 5:
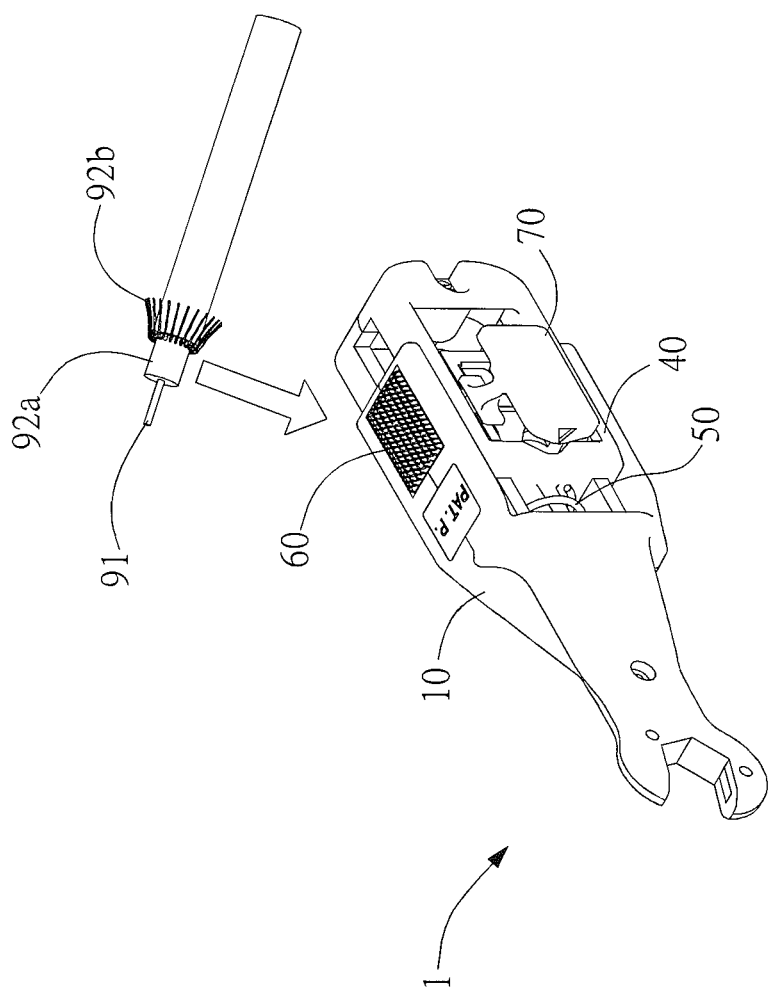
FIG. 5 illustrates a view of using a Velcro strip to separate one of the outer layers of the cable.

Please refer to FIG. 1, FIG. 2, FIG. 4, and FIG. 5. FIG. 1 illustrates a side view of a stripper of the present invention; FIG. 2 illustrates an exploded view of the stripper of the present invention; FIG. 4 illustrates a view of the cable after the outer layer is removed by rotating the cable; and FIG. 5 illustrates a view of using a Velcro strip to separate one of the outer layers of the cable.

As shown in FIG. 1, the stripper 1 to serve as a wrench of the present invention is provided for a user to quickly strip off at least one outer layer 92 of a cable 90, and to lock a coaxial terminal 80 with a signal terminal of an electronic equipment (not shown in FIGs.) or dismantle the coaxial terminal 80 from the signal terminal. As shown in FIG. 4 and FIG. 5, in a specific embodiment of the present invention, the cable 90 is a coaxial cable comprising a central conductor 91 and three outer layers 92. The three outer layers 92 are an insulating layer 92a, a braid shield 92b, and a protecting layer 92c, illustrated from the center outward. However, the cable 90 can be any other kind of cable or insulated wire which can be stripped by the stripper 1.

As shown in FIG. 1 and FIG. 2, in an embodiment of the present invention, the stripper 1 comprises a body 10, an exchangeable tool holder 20, two blades 30, a fixing member 40, an elastic element 50, a Velcro strip 60 and a retaining element 70.

In an embodiment of the present invention, the body 10 is a narrow and long one-piece member made by injection molding. The body 10 comprises a hole 11, a notch 12, two pairs of slots 13, a containing groove 14 and a pair of arc-shaped recesses 15. The hole 11 is disposed close to one end of the body 10, and two concave tracks 112 are disposed at two side walls in the hole 11 respectively. The notch 12 is located at the end of the body 10 opposite to the end near which the hole 11 is disposed. The shape of the notch 12 is the same as the cross-section shape of a part of the coaxial terminal 80, and the size of the notch 12 and cross-section area of the part of the coaxial terminal 80 are substantially equal. In a specific embodiment of the present invention, the stripper 1 allows a user to serve as an open wrench. The notch 12 is hexagonal in shape, but the present invention is not limited to this embodiment. The two pairs of slots 13 are disposed at two corresponding sides of the body 10 in pairs, and the slots 13 are adjacent to the hole 11. The containing groove 14 is disposed between the hole 11 and the notch 12 and communicates with the hole 11 for allowing the elastic element 50 to be placed therein. The two arc-shaped recesses 15 are respectively disposed at two corresponding sides of the body 10 close to the notch 12 for containing a finger of a user.

In an embodiment of the present invention, the exchangeable tool holder 20 comprises a first side 21, a second side 22, a third side 23 and a fourth side 24. The first side 21 corresponds to the second side 22, and the first side 21 comprises a recess 211. The third side 23 corresponds to the fourth side 24. The third side 23 and the fourth side 24 respectively comprise sliding bumps 231 and 241 for engaging with each one of the concave tracks 112 respectively, thereby allowing the exchangeable tool holder 20 to be detachably connected with the hole 11 of the body 10. It is noted that although in this embodiment the exchangeable tool holder 20 is detachably connected with the hole 11 of the body 10, the exchangeable tool holder 20 can be connected with the hole 11 through the fixing member 40.

In an embodiment of the present invention, the two blades 30 are connected with the exchangeable tool holder 20. At least one portion of each of the two first blades 30 protrudes out of the recess 211. The lengths by which the portions of the two blades 30 protrude out of the recess 211 are different from each other.

In an embodiment of the present invention, the fixing member 40 comprises a pair of cases 41, 42 combined by attachment of a screw S. Each of the cases 41, 42 comprises a hollow 43, a concave 44, a pair of flanges 45 and a bump 46. A part of the hollow 43 is adjacent to and communicates with the hole 11. The concave 44 is disposed at a side of the hollow 43 and located in the hole 11. The concave 44 corresponds to the recess 211 of the exchangeable tool holder 20 to form an opening O along with the recess 211 (as shown in FIG. 1). The pair of the flanges 45 of each of the cases 41, 42 is respectively engaged with the pair of slots 13 at the same side of the body 10 and is capable of being moved therein, such that the fixing member 40 is movably connected with the body 10. The bumps 46 are respectively disposed at one end of each of the cases 41, 42 and disposed in the containing groove 14. The bumps 46 allow the elastic element 50 to connect with itself for preventing the elastic element 50 from moving.

In an embodiment of the present invention, the elastic element 50 is a telescopic spring disposed in the containing groove 14 and is connected with the fixing member 40 by allowing the bumps 46 to pass through therein. The elastic element 50 provides an elastic force to the fixing member 40.

In an embodiment of the present invention, the Velcro strip 60 is connected with the body 10 on a side of the body 10, and the Velcro strip 60 is provided for the user to separate a portion of the braid shield 92b from the insulating layer 92a to expose a portion of the insulating layer 92a (as shown in FIG. 5).

In an embodiment of the present invention, the retaining element 70 is connected with the exchangeable tool holder 20, and the retaining element 70 stops one end of the cable 90 when the one end of the cable 90 goes through the opening O and reaches the retaining element 70, thereby allowing the user to rotate the body 10 to remove a fixed length of the at least one outer layer 92.

Figure 6:
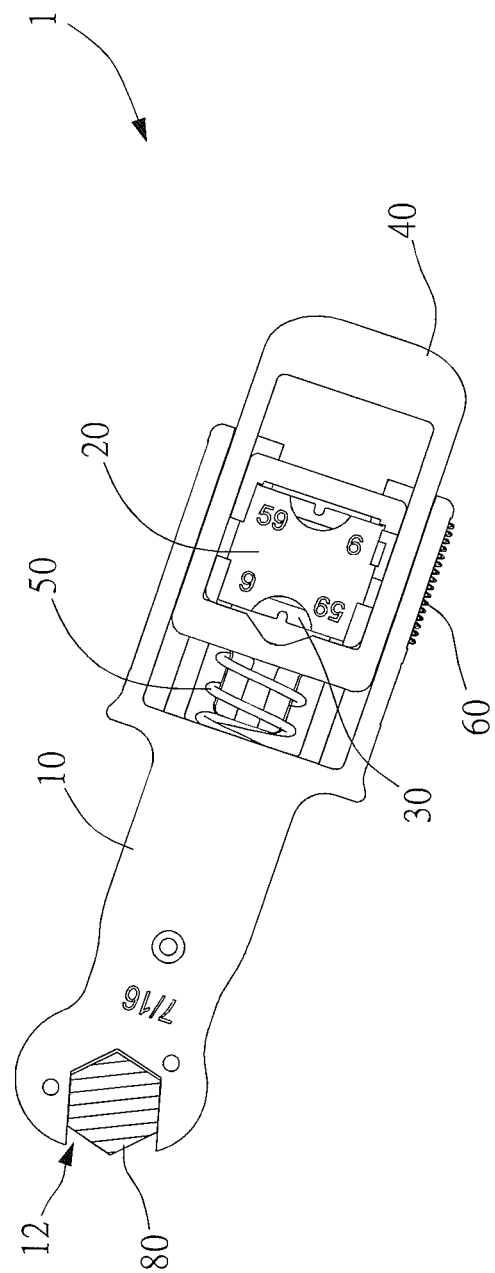
FIG. 6 illustrates a view of rotating a coaxial terminal by a notch of a body of the stripper.

Now please refer to FIG. 2 to FIG. 6. FIG. 3A illustrates a view of placing a cable into an opening; FIG. 3B illustrates a view of removing an outer layer of the cable by rotating the cable; and FIG. 6 illustrates a view of rotating a coaxial terminal by a notch of a body of the stripper.

If a user would like to remove outer layers 92 of a cable 90 by the stripper 1 of the present invention, the user first pushes the fixing member 40 to cause it to move toward the containing groove 14 of the body 10 (in the direction of the arrow F1 shown in FIG. 3A) to widen the size of the opening O formed by the recess 211 and the concave 44. One end of the cable 90 is then placed into the opening O (in the direction of the arrow F2 shown in FIG. 3A). After the one end of the cable 90 is placed into the opening O, the user stops pushing the fixing member 40, and the fixing member 40 is driven by an elastic force generated by the elastic element 50 to move away from the containing groove 14 (in the direction of the arrow F3 shown in FIG. 3B) to work with the blades 30 to hold the cable 90. When the cable 90 is held in the opening O, the user can put a finger on the arc-shaped recess 15 and rotate the stripper 1 (in the direction of the arrow F4 shown in FIG. 3B) to cause the blades 30 to cut off the outer layers 92. The design of the arc-shaped recess 15 allows the user to rotate the stripper 1 smoothly. In addition, since the two blades 30 protrude out of the recess 211 by different lengths, the blade 30 having a longer protrusion out of the recess 211 will remove all of the outer layers 92, while the blade 30 having a shorter protrusion out of the recess 211 will only remove the protecting layer 92c (as shown in FIG. 4).

Furthermore, as shown in FIG. 2, FIG. 3A and FIG. 3B, when the user inserts the cable 90 into the opening O and one end of the cable 90 has reached the retaining element 70, the removed length of the outer layers 92 will be a fixed length. In other words, the retaining element 70 can indicate the length to be removed, such that the user can quickly remove a specific length of the outer layers 92.

When the cable 90 is stripped such that it is in the state shown in FIG. 4, the user can use the Velcro strip 60 of the stripper 1 to separate a portion of the braid shield 92b of the cable 90 from the insulating layer 92a to expose a portion of the insulating layer 92a (as shown in FIG. 5).

Furthermore, since the notch 12 at one end of the body 10 and the cross section area of a part of the coaxial terminal 80 are substantially equal in size, a close fit can be established between one end of the body 10 with the notch 12 and the coaxial terminal 80 when the coaxial terminal 80 is placed into the notch 12 (as shown in FIG. 6). Thus, when the user rotates the body 10, the coaxial terminal 80 will be rotated such that the coaxial terminal 80 is locked to a signal terminal of an electronic equipment (not shown in FIGs.) or is removed from the signal terminal. In other words, the design of the notch 12 of the body 10 allows the stripper 1 of the present invention to serve as a wrench.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A stripper which can serve as a wrench for a user to strip off at least one outer layer of a cable and to lock a coaxial terminal with a signal terminal or dismantle the coaxial terminal from the signal terminal, with the stripper comprising:
   a body having a hole and a notch, wherein the notch has a same shape as a cross-section shape of the coaxial terminal, and wherein a size of the notch and a cross-section area of the coaxial terminal are substantially equal;
   an exchangeable tool holder disposed in the hole, wherein the exchangeable tool holder has a first side comprising a recess;
   at least one blade connected with the exchangeable tool holder, with the at least one blade having at least one portion protruding out of the recess;
   a fixing member movably combined with the body, wherein the fixing member comprises a concave; wherein the concave is located in the hole to correspond to the recess and to form an opening along with the recess, wherein the fixing member comprises a pair of cases, wherein each of the pair of cases has a hollow adjacent to and communicating with the hole, wherein the concave is disposed at a side of the hollow; and
   an elastic element connected with the fixing member to provide an elastic force to the fixing member, wherein the fixing member is driven by the elastic force to work with the at least one blade to hold the cable when the cable is placed in the opening, and wherein the at least one blade removes the at least one outer layer by rotation or movement of the body when the cable is fixedly held in the opening.

2. The stripper as claimed in claim 1, wherein the body is a one-piece member made by injection molding.

3. The stripper as claimed in claim 1, wherein the body further comprises two pairs of slots, wherein each pair of the two pairs of slots is disposed at two corresponding sides of the body respectively; wherein each of the pair of cases has a pair of flanges, and wherein the pair flanges of each of the pair of cases is respectively engaged with the pair of slots at a same side of the body and capable of being moved therein, and wherein the fixing member is movably connected with the body.

4. The stripper as claimed in claim 3, wherein the body further comprises a containing groove communicating with the hole for accommodating the elastic element.

5. The stripper as claimed in claim 4, wherein the fixing member further comprises a bump disposed in the containing groove for limiting the movement of the elastic element.

6. The stripper as claimed in claim 1, wherein the body comprises a pair of arc-shaped recesses respectively disposed at two corresponding sides of the body close to the notch.

7. A stripper which can serve as a wrench for a user to strip off at least one outer layer of a cable and to lock a coaxial terminal with a signal terminal or dismantle the coaxial terminal from the signal terminal, with the stripper comprising:
   a body having a hole and a notch, wherein the notch has a same shape as a cross-section shape of the coaxial terminal, and wherein a size of the notch and a cross-section area of the coaxial terminal are substantially equal, wherein the body has the hole defined two side walls comprising two concave tracks;
   an exchangeable tool holder disposed in the hole, wherein the exchangeable tool holder comprises a first side comprising a recess, a second side and a third side corresponding to the second side, wherein the second side and the third side respectively comprise a sliding bump for respectively engaging with each one of the two concave tracks, wherein the exchangeable tool holder can be detachably connected with the body;
   at least one blade connected with the exchangeable tool holder, with the at least one blade having at least one portion protruding out of the recess;
   a fixing member movably combined with the body, wherein the fixing member comprises a concave; wherein the concave is located in the hole to correspond to the recess and to form an opening along with the recess; and
   an elastic element connected with the fixing member to provide an elastic force to the fixing member, wherein the fixing member is driven by the elastic force to work with the at least one blade to hold the cable when the cable is placed in the opening, and wherein the at least one blade removes the at least one outer layer by rotation or movement of the body when the cable is fixedly held in the opening.

8. The stripper as claimed in claim 7, further comprising a hook and loop fastening strip connected with the body.

9. The stripper as claimed in claim 7, further comprising a retaining element connected with the exchangeable tool holder, wherein the retaining element stops one end of the cable when the one end of the cable goes through the opening and reaches the retaining element, thereby allowing the user to rotate the body to remove a fixed length of the at least one outer layer.

10. The stripper as claimed in claim 7, wherein the exchangeable tool holder is detachably connected with the body.

* * * * *